Oct. 28, 1958
A. M. THOMSEN
2,858,193
METHOD OF MAKING TITANIUM DIOXIDE
Filed Dec. 21, 1953
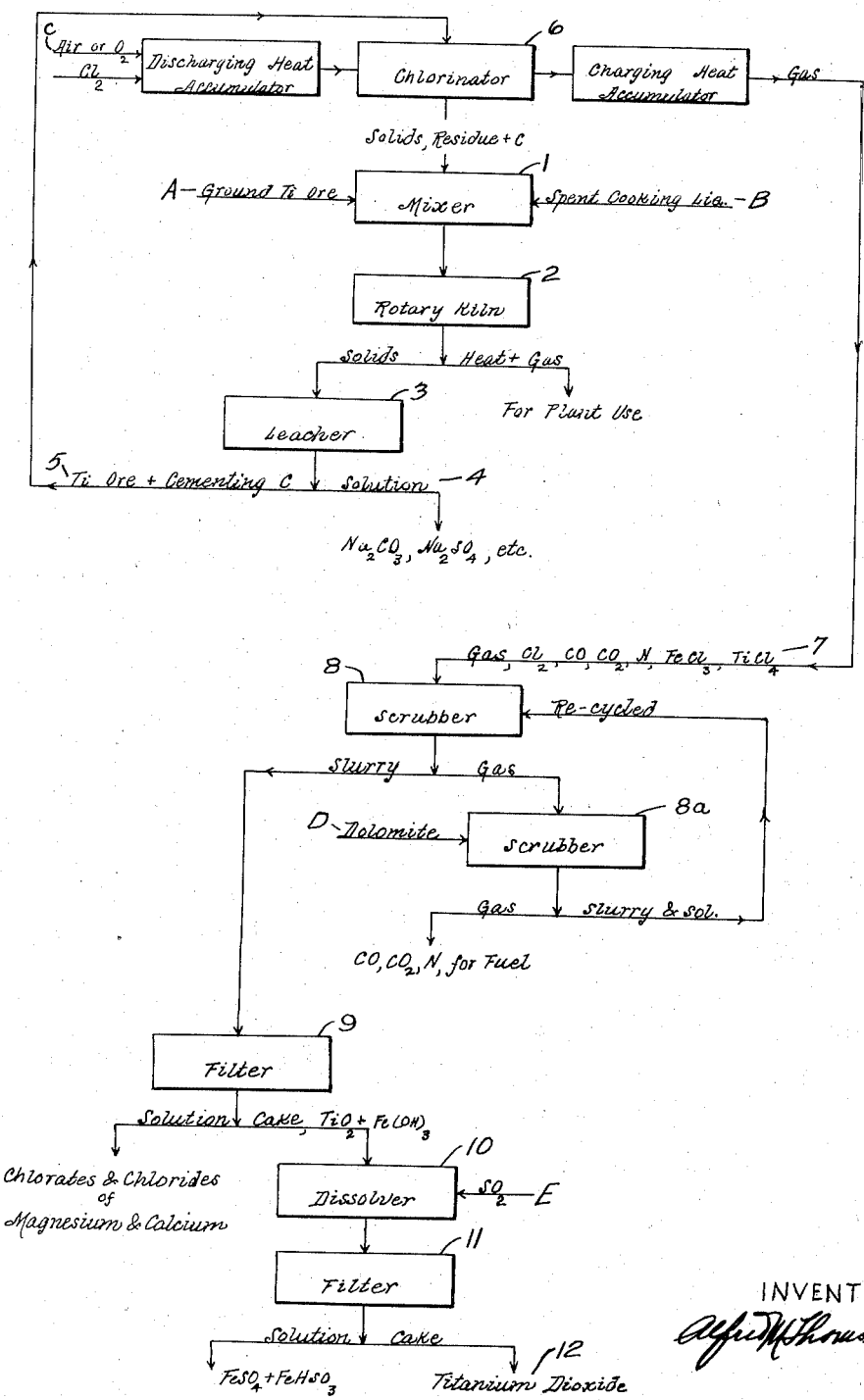
INVENTOR United States Patent Office 2,858,193
Patented Oct. 28, 1958

2,858,193

METHOD OF MAKING TITANIUM DIOXIDE

Alfred M. Thomsen, San Francisco, Calif., assignor to The Champion Paper and Fibre Company, Hamilton, Ohio, a corporation of Ohio Application December 21, 1953, Serial No. 399,226

3 Claims. (Cl. 23—202)

This application is a continuation-in-part of a previous application filed March 23, 1953, Serial Number 344,243 called "Method of Making Titanium," now abandoned. Two methods of approach to a cheap titanium dioxide were disclosed in said older application, a fusion step and a chlorination step. The fusion step has been dealth with in a new application filed November 9, 1953, Serial Number 390,997, called "Method of Making Titanium Dioxide," which application is now abandoned and replaced by a continuation-in-part, Serial No. 623,057, filed November 19, 1956. The instant application is a further and fuller review of the chlorination step.

The specific modification appearing herein is devoted to a linkage between the paper industry and the method of working titanium ores. I have previously shown the advantage of sundry sources of pure ashless carbon, one of which is specifically mentioned as an ammonia based sulphite cooking liquor. I will show herein that any type of cooking liquor can be used as well by the application of the technique now to be disclosed. I will also show ways and means whereby both the paper industry and the titanium industry are benefitted by the use of my invention. A brief description of the general facts will first be given.

In the present state of the art of pulp making it is deemed necessary to burn all the carbon in the spent cooking liquor in order that the resident soda salts may be recovered and re-cycled to the cooking step. As by-product steam is always produced in such incineration there is some use made of this carbon, and in the sulphate cooking technique advantage is also taken of said carbon as a reducing agent for the sodium sulphate used in the operation. By and large, however, this constitutes but a poor utilization of said carbon.

In the chlorinating step of titanium manufacture, involving an entirely conventional reaction, titanium dioxide is contacted with chlorine gas at high temperatures in the presence of a reducing agent which generally is some form of carbon and/or sulphur. The result is volatilized titanium tetrachloride and oxygen compounds of the reducing agent. Inasmuch as actual contact is necessary between two solids reacting with one another the reducing agent is often in the gaseous state. Otherwise, propinquity between titanium dioxide and solid carbon is effected by fine grinding and subsequent briquetting of such powder with a suitable bonding material. I overcome all such difficulties by commingling the titanium ore, or the pure oxide, with a spent cooking liquor and carbonizing the mixture. In this manner I obtain a porous solid, easily permeated by a traversing gas, in which the utmost in propinquity has been achieved between the titanium compound and residual carbon, every speck of said titanium compound being literally in contact with an envelope of solid carbon. As such carbon is virtually ashless, it follows that any residue of carbon-titanium material which remains after chlorination can be re-cycled, en toto, by commingling it with the new charge in any proportion prior to carbonization. A large excess of carbon can thus be constantly retained as factor in making up the charge for chlorination.

The great advantage possessed by such an aggregate of titanium mineral and carbon resides in its physical characteristics. It is obtained as a "lumpy" product opposing but little resistance to the traversing gas stream. The interior of such a lump becomes permeable to said traversing gas through diffusion, hence, the need for great porosity. Finally, as action of the gas on said lumps is to remove in volatile form both resident metals converted to chlorides, carbon in oxide form, and resident oxygen of the mineral simultaneously, it follows that the individual "lump" under consideration becomes more and more porous as the action proceeds. Any unattacked material shielded from action by position near the center of such lumps is then merely re-cycled to a new operation. It is obvious that such a sequence of reactions must result in high efficiency.

While the specific method in which I apply the chlorine to this carbonized product has been fully described in the applications previously referred to I will for the sake of clarity repeat said information here. As a preferred version, this carbonized product is charged into a substantially vertical shaft having wall slots whereby it can be traversed in a horizontal direction, that is, in a direction transverse to the direction of the descent of the material constituting the carbonized mass, by the reacting gas stream.

Such a shaft is flanked by two heat accumulators, one serving as a heater while the other acts as an absorber of heat. Periodically, the direction of such a gas stream is reversed so that the charged heat accumulator becomes the heater and vice versa. The source of heat is, of course, the reaction itself. Chlorination is by itself exothermic but the heating of the charge and volatilization of reaction products require additional heat. The admission of air and/or oxygen commingled with the chlorine supplies such heat and acts as a regulator of temperature.

In common with all such reactions the speed of conversion depends upon many factors. First and perhaps most important is that of temperature. Inasmuch as carbon is infusible at all furnace temperatures and as no possible "stickiness" can impede the descent of the reacting charge, it follows that this item can be raised to any extent desired and thus the capacity of the apparatus greatly increased.

Next in importance is the exhaustion of the reacting gases in chlorine content, and the dilution of that which remains by volatilized chlorides, by oxygen compounds of carbon, and by inert gases. I overcome this difficulty by deliberately leaving much unreacted chlorine in said gas and putting it to a useful purpose during the step of recovering the volatilized chlorides. Unless some such use of this unreacted chlorine were made a part of my process it would be technically sound but economically unsound.

It will be obvious that the temperature in the accumulators must not be allowed to fall so low that deposition of volatilized chlorides becomes a possibility. To recover said volatilized metals I employ a scrubber with a re-circulated douche of water containing in suspension lime and/or magnesia. Excess chlorine is thus converted into a mixture of the chlorates and chlorides of lime and/or magnesia while volatilized chlorides are decomposed into basic insoluble compounds of the metals involved, all constituting a slurry which is the recirculated douche before referred to. Manifestly, it is essential that a portion of such slurry be consistently withdrawn while fresh lime and/or magnesia slurry be added to compensate. Filtration, or other separation, is then made between the soluble and insoluble ingredients of said slurry withdrawal, the volatilized metals being found in the solid portion while chlorides and chlorates of lime and/or magnesia constitute the liquid portion.

Insofar as the chlorate step herein described is concerned this entire procedure is but one of the oldest methods of manufacturing chlorates, here incorporated as an integral part of treating a complex gas stream. Treatment of the precipitate will, of course, depend upon the character of the ore employed. If pure rutile were employed, the residue would consist solely of a hydrous form of titanium dioxide readily converted to an acceptable pigment form. The spent gas leaving said scrubber will consist of any inert gas present and oxides of carbon, chiefly as carbon monoxide. Its use as a fuel is obvious. Full value is thus given to all carbon derived from the spent cooking liquor.

I have represented these steps in their due order in the attached drawing and while describing same I shall show how substantially any ore of titanium can be utilized as well as any type of spent cooking liquor. I start with a "chlorinator," the vertical shaft before referred to as flanked by two heat accumulators, the latter specifically designated as in a "charging" and "discharging" phase. Reversal of flow is not shown as no chemical change is involved thereby, merely a change in direction and in accumulator function being involved.

The gaseous product leaving the right hand accumulator is treated at a lower place on the drawing. The solid residue is shown being re-cycled by commingling in the "mixer" with ground titanium ore and with a spent cooking liquor, after which it enters a rotary kiln in which it is carbonized. For practical purposes all titanium ores contain a little iron and some, such as ilmenite, contain as much or more iron than titanium. I am assuming the use of such an ore, but actual composition is immaterial.

In the carbonization step much combustible gas is evolved and such gases are burned for plant use as indicated. The carbonized product is in the shape of pellets, somewhat resembling cement clinker, and is now ready for the leaching step if that be necessary. Obviously, if the spent liquor be from a mill cooking with an ammonia based sulphite liquor, no leaching step is needed. If a sulphite mill, using the orthodox lime base cook be involved; the spent liquor may be used directly, or if lime be removed with ammonium carbonate, the liquor will to all intents and purposes be the same as the one previously described. The same observation would hold for a sulphite cook made with magnesia as a base or any mixture of lime and magnesia. Naturally, in all such cases the ammonia used would be recoverable from the exit gases of the carbonizing kiln prior to the use of the gas as a fuel.

Spent liquor from a sulphite cook, be it acid or neutral, using a soda base liquor will need a leaching step and in this case the recovered salts will be essentially a mixture of carbonate and sulphate with perhaps a little sulphite, or even sulphide if the temperature in carbonization has been permitted to reach the stage where reduction of the sulphate by carbon commences. The same observation applies to any variant of sulphate cooking, a mixture of carbonate, sulphide and sulphate being the result. Separation of carbonate from sulphate would then be made and the sulphate would be reduced to sulphide in a separate step. If liquor from a soda cook be used only sodium carbonate will be present in the carbonized product and will be removed by leaching. Subsequent treatment of the recovered salts will be obvious to any pulp mill operator, hence will not be further referred to here. In all cases the object aimed at will have been attained, namely, an intimate mixture of ore and carbon in a matrix of substantially ashless carbon in lump form and yet extremely porous.

Such a product as herein described is ideally suited for the chlorination step and hence I have shown this product re-cycled to the "chlorinator" with which the operation started. I will now take up the treatment of the gases produced in the chlorination step. I have shown the scrubbing step, previously described rather fully, as taking place in two stages, gas and liquid being in countercurrent flow. To get a high yield of chlorate with little loss of oxygen by decomposition it is essential that the chlorine in the first scrubber be in excess. To get complete absorption ultimately and to have all chloridized metals precipitated simultaneously demands an excess of base in the second scrubber. In the way indicated this is obtainable in a two stage operation. I have shown dolomite as the base employed because of the flexibility this gives to further treatment of the final chloride solution after chlorate removal. Such matters are outside of this disclosure.

In any event, we have now obtained all the iron and all the titanium of the ore in the form of a mixture of basic hydrated oxygen combinations. I have shown this as being treated with sulphur dioxide thus putting the resident iron in solution partly as sulphate and partly as bisulphite. From such a thoroughly reduced medium almost pure and white titanium dioxide in a hydrated form is easily separated.

I have thus shown how the carbon of spent cooking liquor can be used to much better advantage than merely to burn it, and yet obtain the resident soda salts for re-use in the cooking operation. Inasmuch as titanium dioxide is recognized as the best whitener and opacifier the paper industry has yet obtained, it is obvious that a method whereby this pigment may be produced very cheaply by the industry itself becomes of much technical and economic importance.

In the same vein, it may be mentioned that the superiority of chlorine dioxide over any combination of bleaching with chlorine directly and with hypochlorites is well-understood in the trade. Obviously, the mixture of chlorates and chlorides resulting from my process requires only acidifying with hydrochloric acid and the passage of air to generate chlorine dioxide by well known steps. The spent solution would be found to consist solely of chlorides and for the use of such material there are endless applications.

The drawing will now be described more specifically, particularly as to the critical points of the process. The process begins at mixer 1, where the materials, the ground titaniferous ore, A, and spent soda-base cooking liquor, B, are blended together. This mixture is then carbonized in rotary kiln 2, following which the resultant pebbles or lumps are extracted with water in leacher 3 to recover the sodium compounds such as the carbonate and sulfate. Inasmuch as the sodium compounds are readily soluble in water, the pebbles or lumps are rendered highly porous in the leaching operation. The solution drawn off from the leacher at 4 is used to prepare fresh cooking liquor for the pulping process. Likewise the leached carbonized pebbles are withdrawn, as at 5, and charged into the chlorinator 6. Chlorine is introduced, with or without the addition of air or oxygen, from a suitable source, C, the gas stream first passing through a heat accumulator whereby it is preheated. The reaction gases leaving the chlorinator pass through a second heat accumulator, discharging a portion of the heat evolved in the chlorination; as previously described the flow of the gases is periodically reversed so that the second accumulator, alternately, serves as the preheater.

The volatilized chlorides and other gases (7) emitted from the chlorinator pass through a scrubber, preferably operated in two stages, 8 and 8a, employing a slurry of lime, or of lime and magnesia as obtains when dolomite is used. The slurry D introduced at 8a in the first stage is circulated to the second stage 8 of the scrubber. The iron and titanium chlorides react with the slurry forming basic hydrated oxygen precipitates. Next, the resulting slurry is filtered on suitable equipment 9, to recover the precipitates.

Removal of the iron compounds from the precipitates is necessary and is effected by putting them into solution, for example by introducing sulfur dioxide, E, into dissolver 10 until the iron is solubilized. Separation is then carried out on filter 11 where the solubilized iron compounds are washed out. The titanium precipitate remaining after filtration is then converted into $TiO_2$ pigment such as by calcining in the conventional manner.

In the preceding descriptions I have attempted to show that the pulp industry, per se, and the titanium industry can be fused into a harmonius whole constituting in effect a single process of much importance to the industry served by both, to wit, the business of making paper. But there are many other applications of the technique herein disclosed which have nothing in common with the paper industry, yet with far reaching possibilities in the future development of the making of pulp, and all depending on a more rational use of the residual carbon than the industry now possesses. A few such will be mentioned.

There is such a similarity between the chemical properties of titanium and zirconium that virtually every word said herein is equally true if applied to zirconium, all that is needed is the change of name. The removal of iron as ferric chloride is, of course, thoroughly discussed herein, but it is regarded as an impurity, hence of no economic merit. On the other hand, there are many anhydrous volatile chlorides with extensive application in industry that can employ the herein disclosed use of spent cooking liquor to good advantage. I may mention such metals as magnesium, aluminum, chromium, whose oxides might be substituted for titanium oxides and volatilized with good results.

While it would be beyond the scope of the process herein disclosed to make more than mention of such matters, yet if a volatilized metallic chloride be produced in some such application by using spent cooking liquor in substantially the manner herein disclosed, and if the chlorination be effected by placing said chlorinator between two accumulators and reversing the flow, then I consider that such a method has been definitely disclosed herein.

Having thus fully described my process, I claim:

1. The process for producing titanium dioxide which comprises forming an intimate mixture of finely ground titaniferous material and spent soda base pulping liquor and carbonizing the mixture, leaching said carbonized material with water to remove soda base pulping chemicals and to increase the porosity of said carbonized material and utilizing said chemicals to regenerate fresh cooking liquor, reacting the resultant leached carbonized material with chlorine heated to reaction temperature to form volatile titanium and iron chlorides, reacting the resultant gases with a slurry containing a basic oxygen compound selected from the group consisting of calcium oxide, calcium hydroxide, magnesium oxide and magnesium hydroxide, to convert said titanium and iron chlorides into basic hydrated oxygen precipitates, separating said titanium and iron precipitates from the soluble products, reacting said precipitates with sulfur dioxide to convert the iron present into water soluble compounds, removing said iron compounds and converting said titanium precipitate into titanium dioxide.

2. The method of making titanium dioxide which comprises commingling finely divided titaniferous material with spent soda-base pulping liquor, carbonizing the mixture, leaching said carbonized material with water to recover soda-base pulping chemicals and to increase the porosity of said carbonized material, traversing the resultant leached carbonized material with chlorine heated to reaction temperature to form volatile metallic chlorides, reacting the resultant gases with a slurry containing a basic oxygen compound selected from the group consisting of calcium oxide, calcium hydroxide, magnesium oxide and magnesium hydroxide to precipitate the titanium and iron as basic hydrated oxygen compounds, separating the titanium and iron precipitates from the soluble products of said reaction, reacting said precipitates with sulfur dioxide to convert the iron products into water-soluble products and removing said soluble iron products from the titanium precipitate, and converting said titanium precipitate into titanium dioxide.

3. The method of making titanium dioxide which comprises commingling finely divided titaniferous material with spent soda-base pulping liquor, carbonizing the mixture, leaching said carbonized material with water to recover soda-base pulping chemicals and to increase the porosity of said carbonized material, traversing the resultant leached carbonized material with an agent selected from the group consisting of chlorine, a mixture of chlorine and air, and a mixture of chlorine and oxygen, heated to reaction temperature to form volatile titanium and iron chlorides, utilising the heat evolved in said reaction to heat the incoming stream of said agent, reacting the resultant gases with a slurry containing a basic oxygen compound selected from the group consisting of calcium oxide, calcium hydroxide, magnesium oxide and magnesium hydroxide, to precipitate the titanium and iron as basic hydrated oxygen compounds, separating the titanium and iron precipitates from the soluble products, reacting said precipitates with sulfur dioxide to convert the iron products into water-soluble products, removing said soluble products from the titanium precipitate, and converting said titanium precipitate into titanium dioxide.

References Cited in the file of this patent

UNITED STATES PATENTS

| | | |
|---|---|---|
| 1,158,366 | Bibb | Oct. 26, 1915 |
| 1,246,808 | Ellis | Nov. 13, 1917 |
| 1,315,889 | Per Westin | Sept. 9, 1919 |
| 2,184,884 | Muskat et al. | Dec. 26, 1939 |
| 2,425,995 | Christensen | Aug. 19, 1947 |
| 2,450,156 | Pechukas | Sept. 28, 1948 |
| 2,488,440 | Schaumann | Nov. 19, 1949 |
| 2,614,028 | Schaumann | Oct. 14, 1952 |

OTHER REFERENCES

"Titanium," by Jelks Barksdale, pages 314, 315; 1949 ed., Ronald Press Co., N. Y.